March 24, 1942.    J. H. CRUMBLE    2,277,391
BICYCLE DRIVING MECHANISM
Filed Aug. 7, 1941    2 Sheets-Sheet 1
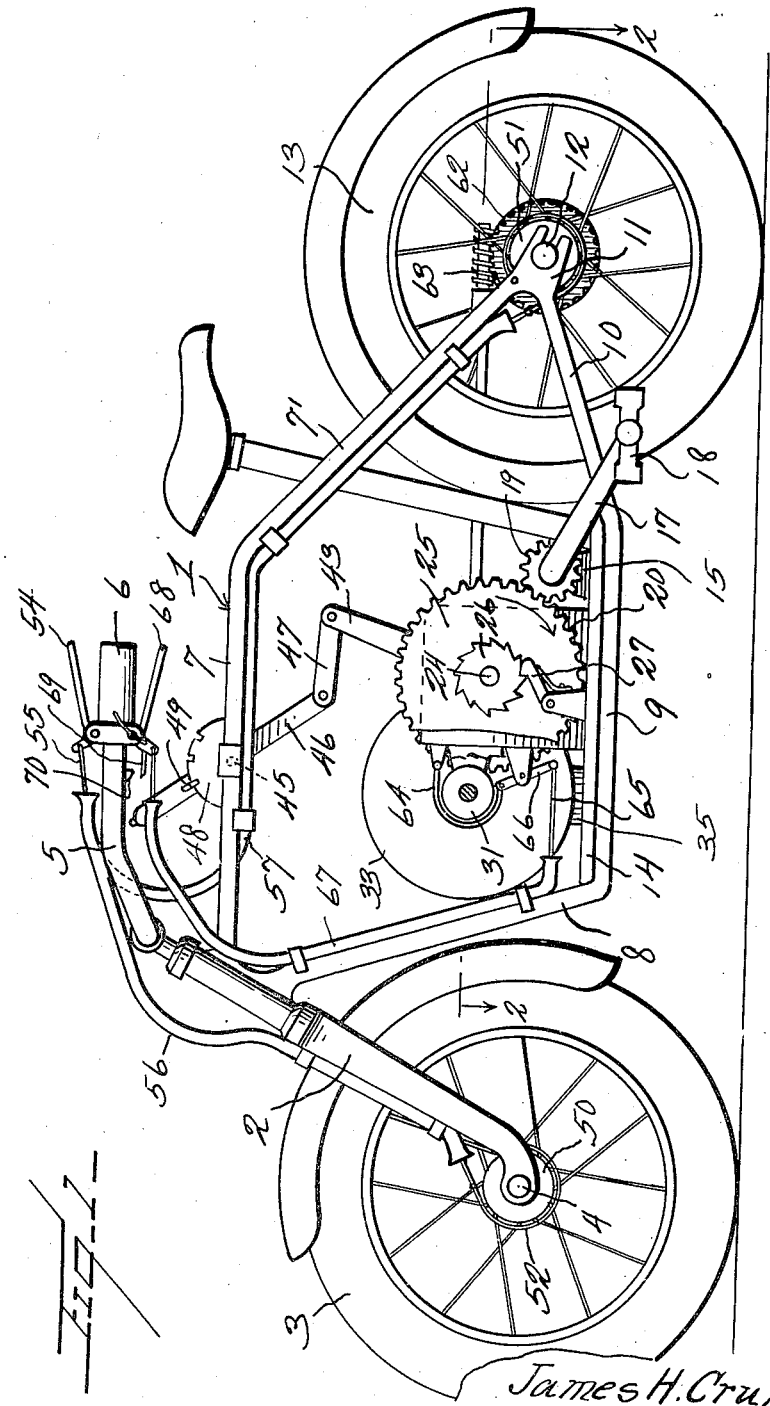
Inventor
James H. Crumble
By Watson E. Coleman
Attorney

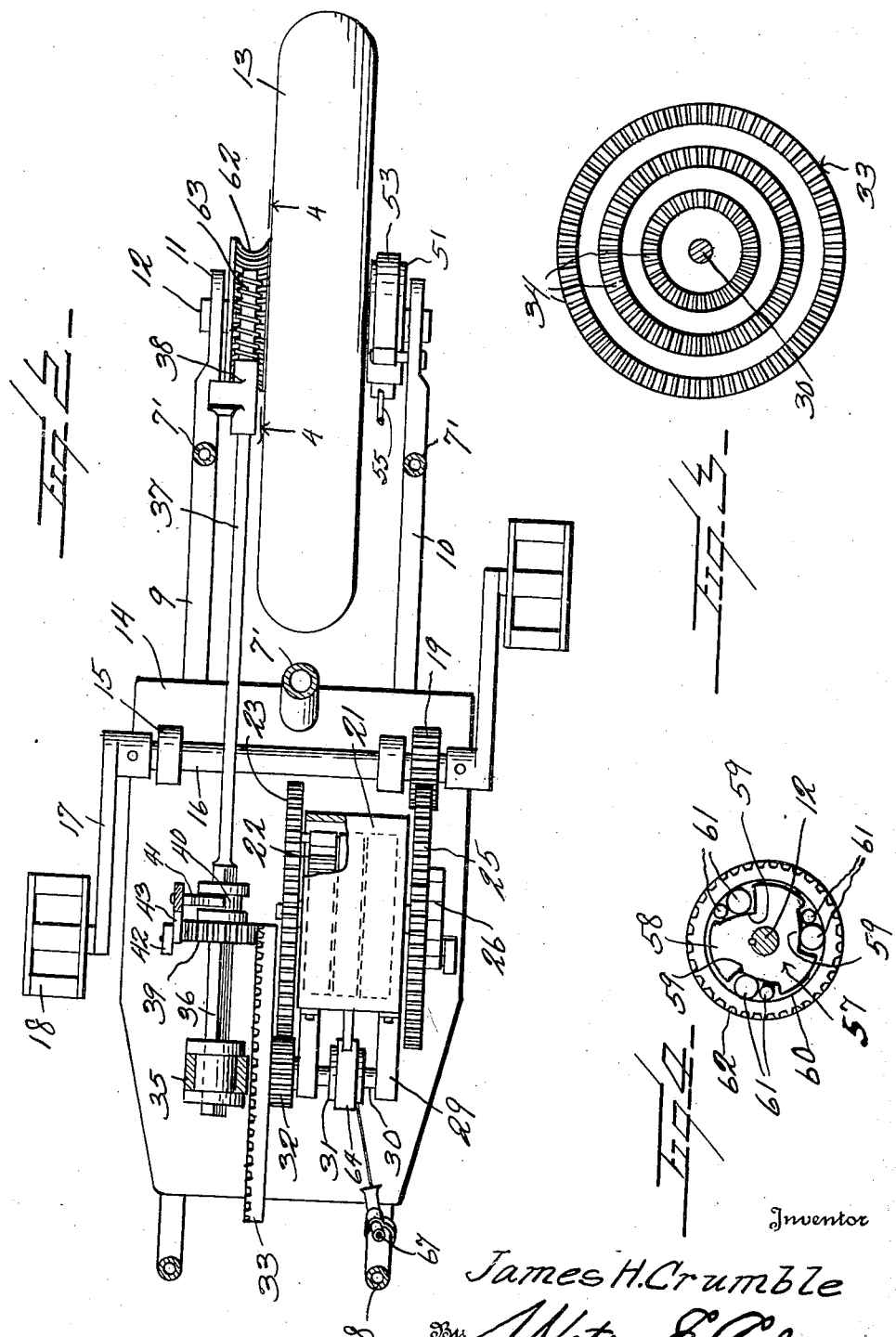

Patented Mar. 24, 1942

2,277,391

UNITED STATES PATENT OFFICE 2,277,391

BICYCLE DRIVING MECHANISM

James H. Crumble, Brooklyn, N. Y.

Application August 7, 1941, Serial No. 405,878

6 Claims. (Cl. 280—215)

This invention relates generally to the class of land vehicles and pertains particularly to a power driven cycle of the two-wheel type.

The present invention has for its primary object to provide a two-wheel or bicycle type of vehicle having mounted thereon a novel type of power mechanism by means of which the cycle is driven, such mechanism being in the form of a spring motor operatively coupled with one of the wheels of the cycle and having coupled therewith a pedal operated shaft by means of which the spring motor may be wound up when and as necessary to maintain at all times a readily available source of driving power for the vehicle.

Another object of the invention is to provide a vehicular structure of the character stated with a power unit set up in a novel manner and mounted upon the vehicle frame in a compact arrangement so that there is obtained a mechanism set up of a form which will give the maximum of efficiency in the way of power delivered to the rear wheel of the cycle, while at the same time taking up a minimum amount of space within the frame of the vehicle.

Still another object of the invention is to provide a bicycle type of vehicle having a spring motor driving means mounted thereon together with means for manually winding up such motor when necessary, and a change speed mechanism interposed between the motor and the driven wheel whereby different operating or driving speeds can be employed as desired by the rider.

Still another object of the invention is to provide in a bicycle type vehicle a pedal-wound spring motor driving means operatively coupled with the rear wheel of the vehicle with an over running clutch or coaster device for permitting the free running of the vehicle when an excessive speed has been attained or when going down hill, while the motor is stopped.

Still another object of the invention is to provide in a motor driving means for a bicycle or similar vehicle, a braking mechanism by means of which the running or operation of the motor may be controlled at will and braking power may be applied also to the wheels of the vehicle, thus making it possible to check the operation of the motor or to stop the running of the vehicle by application of the brakes to the wheels, as desired by the rider.

Many other objects and advantages of the present invention will become apparent as the description of the same proceeds, and the invention will be best understood from a consideration of the following detailed description taken in connection with the accompanying drawings, it being understood, however, that the invention is not to be considered as limited by the specific illustration or description but that such illustration and description constitutes a preferred embodiment of the invention.

In the drawings:

Figure 1 is a view in side elevation of a vehicle and driving or operating mechanism therefor, constructed in accordance with the present invention, a portion of the structure being in section and also broken away to clearly show details of construction;

Figure 2 is a horizontal section taken substantially on the line 2—2 of Figure 1, a portion of the spring motor housing being in section;

Figure 3 is a view in elevation of the face of the multiple speed gear plate;

Figure 4 is a sectional view taken on the line 4—4 of Figure 2 showing the over-running clutch.

Referring now more particularly to the drawings, the numeral 1 generally designates the frame of the vehicle structure which, as shown, is of the motorcycle type. This frame includes the front wheel steering fork 2 with which is pivotally connected the front wheel 3, through the medium of the front axle 4. With the steering fork is connected the handle bar 5, in the usual manner, each side of the bar having a hand grip portion 6. Only one of these hand grips is here illustrated but as this is standard construction it has not been considered necessary to show the two sides of the handle bar with the two hand grips which form a part thereof.

Rearwardly of the steering fork 2 the vehicle frame comprises a horizontal upper portion 7 which extends rearwardly and downwardly into a fork having the two spaced portions 7', while below the horizontal top bar 7 there is located, directly behind the steering fork 2, the spaced downwardly and rearwardly extending bars 8, each of which merges into a horizontal rearwardly extending portion 9 which in turn merges into an upwardly inclined portion 10 and joins a portion 7' in an axle bearing 11. The bearings 11 support the rear axle 12 on which is carried the rear wheel 13.

In accordance with the present invention, there is provided a table or platform 14 which is supported on and secured to the horizontal bars 9 of the lower portion of the frame. Supported in suitable bearings 15 upon the platform is a transversely extending shaft 16 upon each end of which is a crank arm 17 carrying a foot pedal 18. This shaft 16 carries a gear pinion 19 for the purpose about to be described.

Mounted upon a suitable support, here indicated by the numeral 20, in advance of the shaft 16, is a spring motor housing 21 within which is located a spring motor unit which is preferably made up of a plurality of individual springs 22 operatively coupled together to provide a prolonged driving action for a driven gear 23 which is operatively coupled with the spring, as shown in Figure 2. Extending axially through this housing 21 is a shaft 24 which is connected with the springs in the housing and which carries upon one end the gear 25 which is operatively coupled with the pinion 19, whereby when the pinion is rotated the shaft will be turned and the springs wound up or placed under tension. This shaft also has secured thereto the toothed ratchet wheel 26 which is engaged by the ratchet or pawl 27 which functions to prevent the unwinding of the spring through gears 19 and 25. This pawl and ratchet mechanism, however, permits the rotation of the gear 25 in one direction for the winding of the springs, as will be readily apparent.

Upon the opposite side of the motor casing 21 from the shaft 16 are bearings 29 which support a stub shaft 30. This shaft carries a brake drum 31 and a gear pinion 32, the latter being located upon the end of the shaft 30 in position to have toothed connection with the driven gear 23. There is also secured to the end of the shaft 30 a multiple gear disk 33 which, as shown in Figure 3, has one face formed to provide the plurality of concentrically related gears 34.

Supported upon the platform 14 upon the gear side of the disk 33 is a suitable bearing 35 supporting a square shaft 36 which forms an integral continuation of an end of the driving shaft 37 which extends rearwardly and is supported at its rear end in the bearing 38 which is secured to an adjacent portion of the frame.

Upon the squared shaft 36 or the forward end portion of the drive shaft 37 there is slidably mounted the shiftable driven gear 39 upon one side of which is formed or secured a collar 40 to be engaged by a shifting fork 41.

Upon the side of the shaft 36 remote from the gear plate 33 there is mounted a pivot 42 with which the lower end of a shift lever 43 is connected and this lever has attached thereto and carries the shift fork 41 so that when the lever is oscillated sliding movement will be given to the gear 39 upon the square shaft 36 to change the connection of this gear with the change speed plate 33, from one gear 34 to another.

Upon the upper part 7 of the frame there is provided a pivot center or point 45 upon which a hand lever 46 is mounted and the lower end of this lever is connected by the link 47 with the upper end of the lever 43 so that the operator while riding upon the vehicle may be able to shift the gear 39 as desired. A suitable means may be provided for securing the hand lever 46 in a desired set position such, for example, as the notched sector plate 48 and a latch finger 49 carried by the lever for selective engagement in the notches of the plate, as shown in Figure 1.

Upon the front and rear axles are mounted brake drums 50 and 51 respectively and each has associated therewith a suitable brake band or shoe which are indicated respectively by the numerals 52 and 53 for the front and rear drums. These brake bands or brakes are operated by the hand lever 54 which is pivotally mounted upon a hand grip 6 and is connected with one end of a control wire 55 which is divided to extend to the front and rear brake bands, to which it is connected, through the guide tubes or casings 56 and 57. Thus it will be seen that with this braking mechanism braking action may be applied to both wheels simultaneously.

The rear axle 12 is coupled with the rear wheel 13, when a driving connection is established between the drive shaft 37 and the axle, through the medium of an over-running clutch which is indicated generally by the numeral 57 and illustrated particularly in Figure 4. This clutch construction comprises an inner body 58 having a number of arcuate peripheral jaw faces 59, and an encircling ring body 60. This ring body is operatively coupled with the shaft carried body 58 by the wedging rollers 61 which are interposed between the jaws 59 and the inner side of the ring and are wedged between the jaws and the ring when the ring is turned in a direction tending to roll the wedge rollers toward that end of the adjacent jaw surface 59 which is nearest the ring. The outer part of this ring 60 of the clutch unit is also toothed, as indicated at 62, to provide a worm gear. A cooperating worm 63 is carried upon the rear end of the drive shaft 37 for toothed connection with this gear so that driving movement may be transmitted to the rear wheel of the vehicle.

Cooperating with the brake drum 31 which is carried upon the shaft 30, is a brake band or shoe 64 which is controlled or actuated by the control wire 65 which passes from one end of the pivotally mounted lever 66 through a guide tube or sheath 67 to an actuating handle or lever 68 carried upon one of the hand grips of the handle bar. As shown in Figure 1, the other end of the lever 66 is operatively coupled with the free end of the brake band so that this lever, which is pivotally mounted intermediate its ends, when oscillated in the proper direction, will draw the band in around the adjacent drum to grip the same and thus stop or retard the turning of the shaft 30 by the spring motor. Thus, it will be seen that the rider of the vehicle will be able to stop the operation of the motor and coast freely when on a grade or after the vehicle has attained a certain speed, while the power of the spring will be held in reserve and if during this time it is desired to stop the forward movement of the vehicle this can be accomplished by the actuation of the wheel brake control lever 54 so as to operate the brakes associated with the front and rear wheels.

Any suitable means may be provided for securing the motor brake in applied position when desired such as, for example, by the provision of a latching finger 69 which may be operatively coupled with the handle 68 and adapted to be oscillated into holding engagement with a keeper 70 when the brake is applied and the lever 68 is drawn in toward the adjacent handle 6.

From the foregoing it will be readily apparent that there has been disclosed herein a novel, compact driving mechanism which may be installed upon any suitable motorcycle type of frame and in which power can be readily stored up by the operation of the pedals to facilitate driving the vehicle. Thus, there has been provided a means whereby a vehicle of this character may be powered without requiring the consumption of valuable fuel, the conservation of which is of such great importance at the present time.

It will also be readily seen that by the provision of the speed change mechanism the spring motor may be made to drive the vehicle at slow speed as desired by the rider merely by the shifting of the gear 39 with respect to the change speed gears which form an integral part of the driven plate 33.

I claim:

1. A driving mechanism for a wheeled structure having a frame and supporting wheels, comprising a spring operated motor, a shaft rotatably supported adjacent the motor, means supporting said shaft and motor upon the frame, foot pedal means for rotating the shaft, a driving connection between the shaft and the motor for effecting the winding up of the motor upon rotation of the shaft in one direction, a driving shaft rotatably supported on the frame and having driving connection at one end with a wheel, a driving gear connection between the motor and the driving shaft, and a change speed means forming a part of the driving connection between the driving shaft and motor for facilitating increasing or decreasing the speed of operation of the driving shaft by the motor.

2. A vehicle and driving mechanism therefor as set forth in claim 1, including an over-running clutch interposed between the driving shaft and the vehicle wheel to which the power is delivered whereby coasting of the vehicle is permitted independently of the driving operation of the motor.

3. A structure as set forth in claim 1 in which speed change mechanism comprises a concentric series of driven gears, and a shiftable gear pinion operatively coupled with the driving shaft and arranged for selective toothed connection with the driven gears.

4. A spring motor driven bicycle comprising a frame including a lower portion consisting of a pair of spaced longitudinally extending bars, supporting wheels operatively coupled with the frame, a platform supported upon said bars, a shaft supported on the platform to extend transversely thereof, foot pedals operatively coupled with the shaft for rotating the same, a spring motor unit having a power gear operatively coupled with said shaft and having a driven gear, a second shaft supported upon the platform, an operative coupling between the second shaft and said driven gear, a drive shaft having one end rotatably supported on the platform and extending rearwardly therefrom adjacent one of said wheels, an operative coupling between the other end of the drive shaft and the said one of the wheels, and a change speed driving coupling between the second shaft and the drive shaft through which transmission of power from the spring motor to the drive shaft is effected.

5. A structure as set forth in claim 4 wherein said change speed coupling comprises a disk plate carried upon the second shaft to be rotated thereby, a plurality of concentric gears integral with a face of said plate, a pinion slidably keyed to the drive shaft to be moved radially across the face of said plate for selective coupling with said concentric gears, and a hand lever means for facilitating the shifting of the last mentioned gear pinion relative to the concentric gears.

6. In a spring motor driven bicycle as set forth in claim 4, a brake drum mounted upon said second shaft, a brake shoe supported for operative engagement with said drum, and hand control means for applying said brake shoe to the drum.

JAMES H. CRUMBLE.